E. G. HOFFMANN, DEC'D.
A. W. KIDDLE & A. M. BECKER, EXECUTORS.
DRIVING MECHANISM FOR VEHICLES.
APPLICATION FILED SEPT. 16, 1907.
1,076,652.
Patented Oct. 21, 1913.
3 SHEETS—SHEET 1.
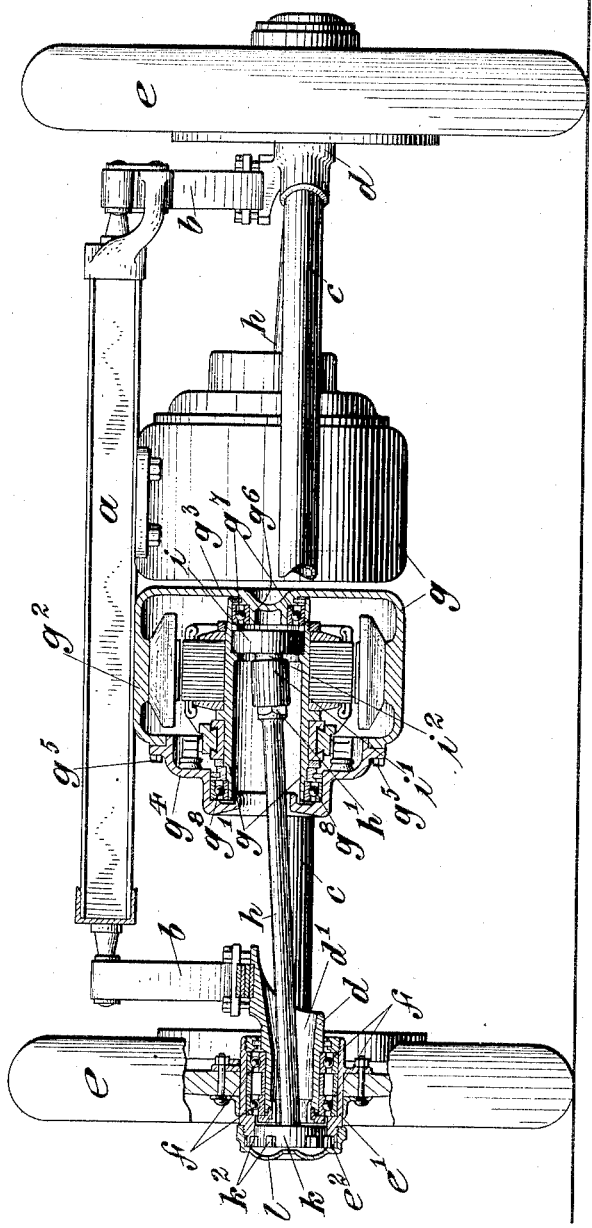

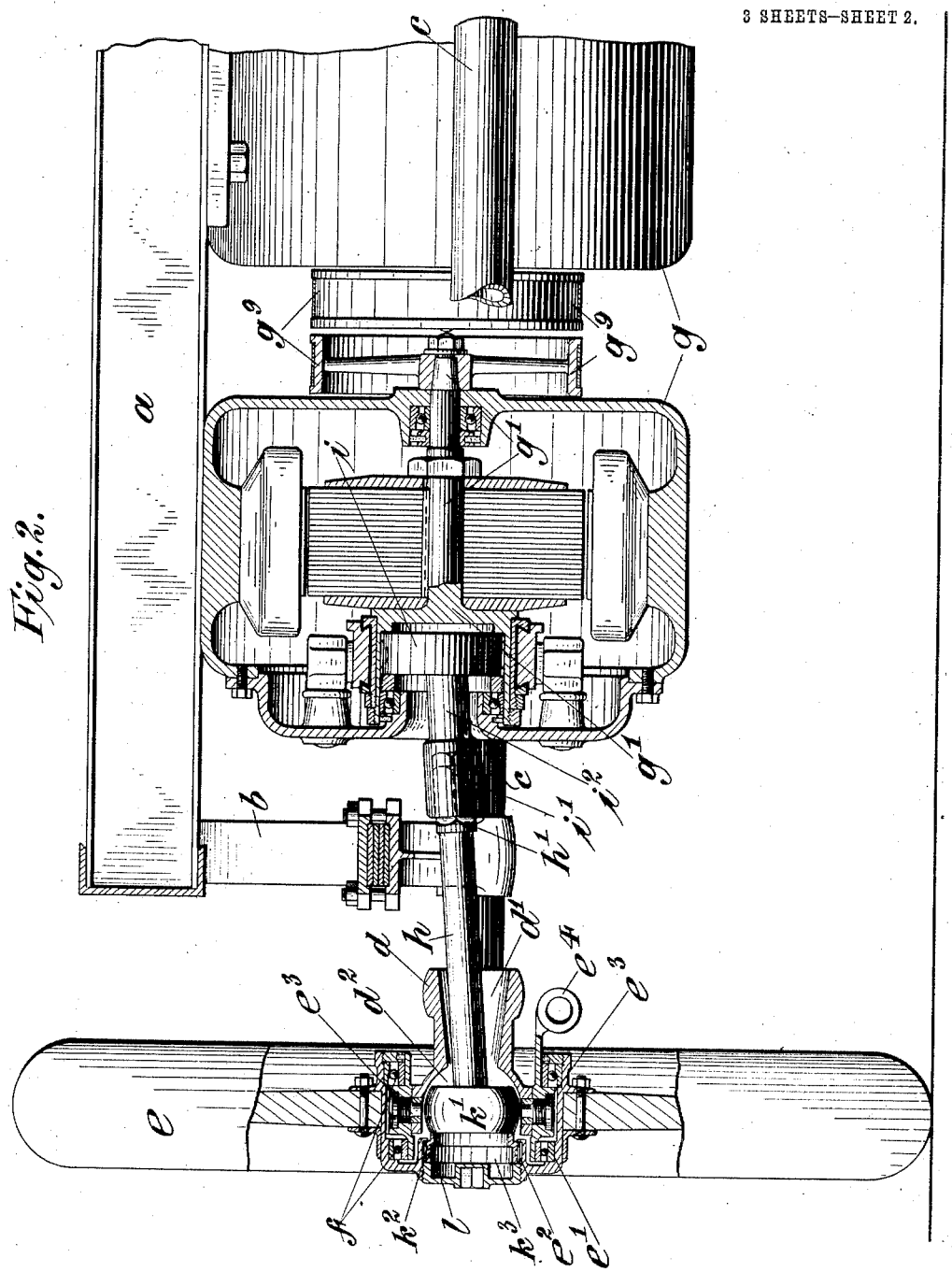

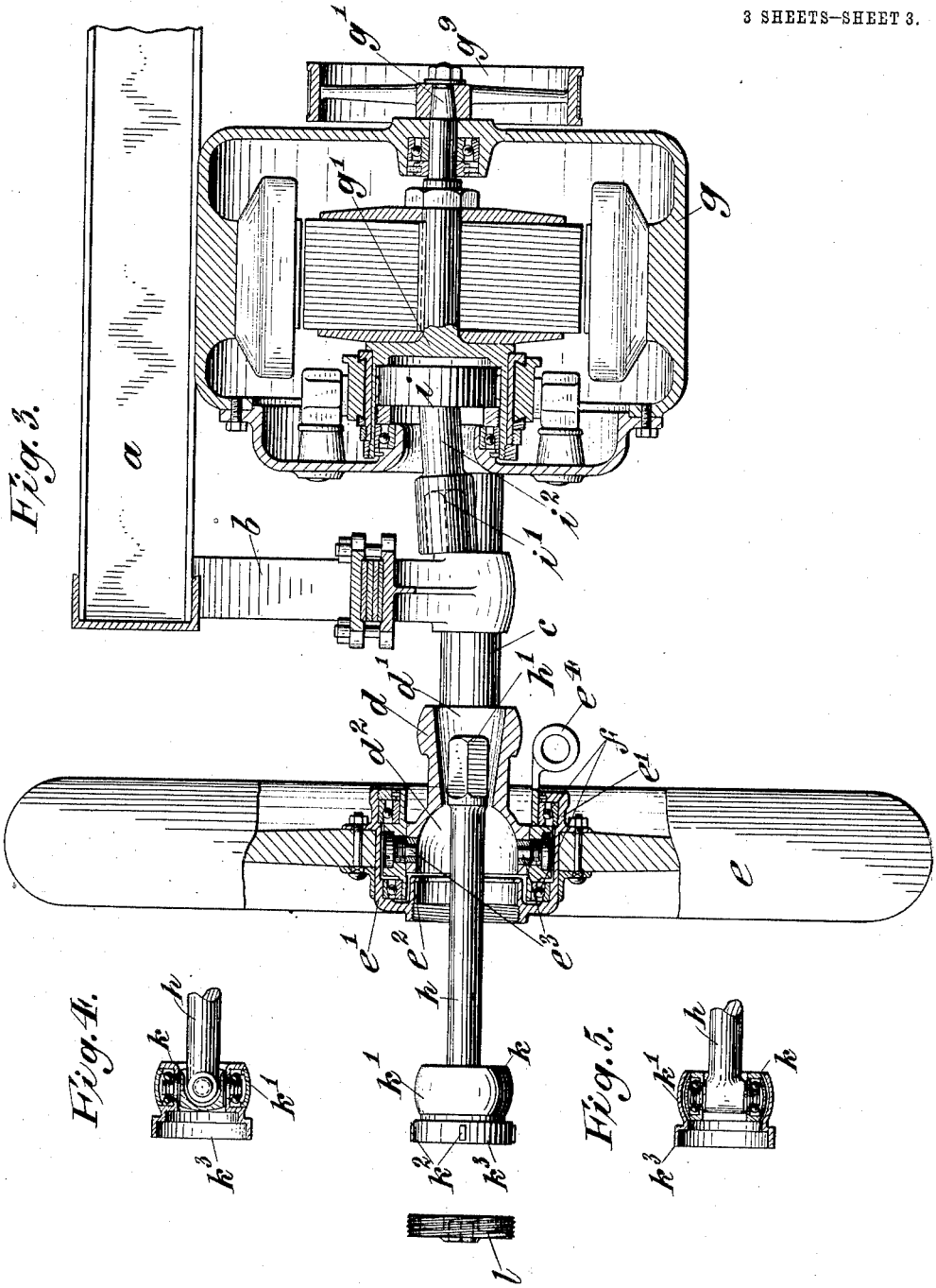

UNITED STATES PATENT OFFICE.

ERNST GUSTAV HOFFMANN, OF NEW ROCHELLE, NEW YORK; ALFRED W. KIDDLE AND AMALIE MATHILDE BECKER EXECUTORS OF SAID HOFFMANN, DECEASED.

DRIVING MECHANISM FOR VEHICLES.

1,076,652.  Specification of Letters Patent.  Patented Oct. 21, 1913.

Application filed September 16, 1907. Serial No. 393,048.

*To all whom it may concern:*

Be it known that I, ERNST GUSTAV HOFFMANN, a citizen of the United States, residing in the city of New Rochelle, in the county of Westchester and State of New York, have invented certain new and useful Improvements in Driving Mechanism for Vehicles, of which the following is a specification, reference being had to the accompanying drawings, forming a part hereof.

This invention relates to power driven vehicles in which the driving wheels are directly connected to a driving element supported from above the springs, as upon the vehicle body, as distinguished from a driving element mounted upon the axle or running frame. As such, the invention may be embodied in non-dirigible vehicles, as railroad cars, engines, etc., as well as in automobiles and other dirigible vehicles. With this arrangement, it is obvious that the driving element or elements, whatever they may be, are not subjected to the shocks and vibrations which would be transmitted to such parts of the driving mechanism as are supported from the axle without spring suspension.

Heretofore, it has been proposed to support a differential gear upon the body of a vehicle and to connect the gear with each driving wheel by means of a short shaft, the ends of which were connected by universal joints respectively to the gear and to another short shaft which was rigidly connected to the hub of the corresponding driving wheel and extended through a hollow axle end upon which this wheel was mounted. The chief objection to this construction is that the length of the intermediate shaft with universal joints at the ends thereof must necessarily be quite limited and the oscillatory movement thereof correspondingly great, with the result that the angular movement of the universal joints is such as to impose excessive requirements upon these joints and in a measure to interfere with the proper transmission of power from the driving element to the driving wheels.

One of the objects of the present invention is to provide for such a lengthening of the intermediate shaft in this construction, as shall reduce considerably the oscillatory movement of this shaft and the angular movement of the universal joints, and for this purpose provision is made for extending this shaft either outwardly into the hub of the wheel itself, or inwardly into the body of the driving element or for extending it in both directions, that is, into the wheel hub and into the body of the driving element at the same time. In all these cases, the intermediate shaft is connected, as before, through universal joints to the driving element at its inner end and to the corresponding driving wheel at its outer end. Where it is extended into the driving wheel hub, the short shaft, which was formerly journaled in the hollow axle end and rigidly connected to the wheel hub, is dispensed with, and connection is made with the wheel hub directly through the universal joint. Where the intermediate shaft is extended at its inner end, the driving element is provided with a hollow shaft with which a direct connection is made to the intermediate shaft through the universal joint which is located inside the hollow shaft. In another application for Letters Patent of the United States, filed June 8, 1907 and Serial No. 377,851, the construction in which the intermediate shaft is extended into the wheel hub is set forth and claimed. In the present case, however, the improvements not only have to do with the lengthening of the intermediate shaft between the driving element and the corresponding driving wheel, but also include an improved driving system in which the driving element is an electric motor supported from above the springs, preferably upon the vehicle body, and directly connected with a driving wheel or wheels.

The object of this improved system of driving (and accordingly another object of the invention) is to eliminate all gearing from the driving mechanism. By employing two motors, where there are two driving wheels, as in an automobile, it is possible, as is well known, to do away with differential gearing. It has not been possible heretofore, however, to support two motors from the vehicle body and between the driving wheels and to operatively connect the motors with their respective driving wheels without the interposition of gears or other more or less complex mechanism, on account of the extremely limited space which is left between the motors and their respective driving wheels. By means of the present improvements, the motors may be directly connected with their respective driving wheels through intermediate shafts provided with universal joints at each end, the shafts being extended into hollow armature shafts provided in the motors or into the hubs of the driving wheels, or into both the armature shafts and wheel hubs as will be explained more fully hereinafter. By means of the present invention therefore, the advantages of supporting the driving element or elements upon the vehicle body are secured without interfering in any way with the proper transmission of power to the driving wheels, or with the relative movement of the driving wheels and vehicle body, and without the necessity of employing gears or gearing of any description.

Another object of the invention is to devise means whereby the driving wheels may be permitted to have a swiveling movement, as for steering, without interfering with the transmission power and to provide in connection with such means a suitable braking device. This will all be explained hereinafter and with reference to the accompanying drawings in which the improvements are illustrated as they might be embodied for instance in a motor road vehicle.

In said drawings, Figure 1 is a view partly in section and partly in elevation of so much of a motor vehicle as will enable the application of the invention to be understood. Fig. 2 is a similar view, upon a larger scale, in which the driving wheel is permitted to swivel. Fig. 3 is a detail view of the parts shown in Fig. 2, some of these parts being removed to show the manner of assembling, and Figs. 4 and 5 are detail sectional views of a universal joint which may be employed.

In the embodiment of the invention illustrated in Fig. 1 of the drawings, the body of the vehicle, sufficiently represented at $a$, is shown as supported through the usual leaf springs $b$ upon an axle $c$. Each of the driving wheels $e$ is journaled upon a hollow axle end $d$, suitable ball bearings $f$, the construction of which is not necessary to be described in detail herein, being interposed between the exterior of the hollow axle ends $d$ and the interior of the hub $e'$ of the wheel, the hub being preferably extended somewhat beyond the extremity of the axle end $d$. The driving element, in the present case, is an electric motor $g$ and two electric motors are provided, one for each driving wheel, in order to avoid the necessity of employing a differential gear. These motors are supported from above the springs and in the present case are shown as bolted to the body $a$ and are therefore spring suspended with reference to the axle $c$ and wheels $e$. Interposed between each wheel and its corresponding driving element $g$ is an intermediate shaft $h$ through which the power is transmitted from said element to said wheel. Each of these shafts is connected at its inner end with the armature of the corresponding motor through a universal joint, indicated at $i$, and at its outer end with the corresponding driving wheel through a universal joint indicated at $k$. It will thus be obvious that each of these shafts during the transmission of power will have an oscillatory movement the degree of which will depend upon the relative movement of the motors and driving wheels and also upon the length of the shafts. It will also be noted that the shafts and the universal couplings serve as a yieldable connecting means between the motors and wheels thereby permitting a relative movement between the latter. It will also be obvious that with two motors installed between the driving wheels, as illustrated in Fig. 1, the space left for a connecting shaft between the motors and their respective driving wheels will be exceedingly limited and that unless some provision is made for extending this shaft beyond the limits of the space thus imposed, each shaft will have to be made so short that the oscillations which it describes during the running of the vehicle will be too large to be practicable. For this reason, provision is made to extend each of these shafts into the corresponding motor or into the corresponding wheel hub or into both the corresponding motor and wheel hub. The particular conditions in any given case will determine the proper length of each intermediate shaft $h$ and will also determine whether or not it should be extended into the motor or into the wheel hub or into both. In the application for Letters Patent of the United States above referred to a suitable construction is set forth whereby the intermediate shaft may be lengthened by extending it into the wheel hub. In that case and in the present case, the axle end $d$ is made hollow and the shaft $h$ is extended into the hollow axle end and preferably entirely through the same, bringing the universal joint $k$ at the outer end of the wheel hub. The chamber $d'$ of the hollow axle end $d$ is tapered or enlarged so as to permit the oscillations of the shaft $h$ to take place without restriction. The precise form of the universal joint $k$ is not material to the present invention but it is perfectly formed with an outer ring $k'$ which constitutes one terminal of the joint and this ring may be conveniently provided with lugs $k^2$ to have a driving engagement with notches $e^2$ in the outer end of the wheel hub $e'$. The outer ring of the joint $i$ may have a similar engagement with the motor armature presently to be referred to. The driving engagement of the universal joint $k$ with the outer end of the wheel hub may be maintained by a cap $l$ which covers the joint and holds the lugs $k^2$ in the notches $e^2$, having itself a threaded engagement with the exterior of the hub $e'$. Provision must be made for the constant variation in distance between the motor and wheel hub, due to the relative movement of the motor and wheel. For this purpose a sliding joint of suitable character is conveniently formed somewhere in the intermediate shaft $h$ and, as illustrated in Fig. 1, the shaft is shown squared as at $h'$ to enter a corresponding seat $i'$ in what may be referred to as the hub $i^2$ of the adjacent member of the universal joint $i$, a driving engagement being thus maintained with freedom for longitudinal slip.

Where the shaft $h$ is extended inwardly, the corresponding motor armature is preferably provided with a hollow armature shaft, indicated in the present case at $g'$. In the particular construction illustrated in Fig. 1, the motor has a single casing $g^2$ having an integral end plate $g^3$ and a removable end plate $g^4$ secured by bolts $g^5$. The end plate $g^3$ has a short inward extension $g^6$ which supports bearings $g^7$ for one end of the hollow armature shaft $g'$, while the end plate $g^4$ supports a bearing $g^8$ for the other end of the hollow armature shaft $g'$. The universal coupling $i$ is located within the hollow armature shaft between the ends of the casing, the outer ring of the particular universal joint shown being rigidly connected with the armature shaft, as already stated. As illustrated in the drawing the location of the universal joint $i$ within the hollow armature $g'$ is such as to extend the shaft $h$ practically through the motor. It will be obvious however that the particular condition, as before stated, will determine whether the shaft $h$ shall be extended through the motor or through the wheel hub or simply a short distance into either or both of these members.

In the embodiment of the invention illustrated in Figs. 2 and 3 the wheel is mounted to swivel upon the main axle $c$, and for this purpose the interior member of the wheel hub $e'$ is secured to the hollow axle end $d$ by means of pivots $e^3$, a steering arm $e^4$ being secured to the hub in case the steering is to be effected through the wheel. The outer ring $k'$ of the universal joint is spherical as illustrated and the chamber $d^2$ of the hollow axle end $d$ is correspondingly shaped to permit the swiveling to take place without interference between the universal joint $k$ and the hollow axle $d$. In this embodiment of the invention the universal joint $k$ is located more nearly in the center line of the wheel, and to permit the swiveling to take place properly the lugs $k^2$ are provided upon an extension $k^3$ formed upon the outer ring $k'$. A screw cap $l$ is provided as before upon the exterior of the hub to hold the universal joint $k$ in position. At its inner end the shaft $h$ is extended only slightly into the motor and the motor shaft $g'$ is not hollow from end to end but only for a portion of its length and is solid and of a reduced diameter for the rest of its length. The universal joint $i$ rests within the hollow portion to which it is rigidly secured, as before. With a swiveling wheel, and an oscillating shaft, it will be obvious that it will be impracticable to employ the ordinary braking devices such as those which comprise a drum secured to the wheel or shaft and a band for the drum secured to the running frame and adapted to be drawn tightly around the drum. Accordingly, braking devices have been provided, as shown in Figs. 2 and 3, upon the motor shafts $g'$, the motors, for this purpose, being slightly separated and brake drums $g^9$ being secured to the respective shafts between the motors. It will be noted that the brake mechanisms are applied only to the drums on the motor shafts.

It will be seen that the improved construction makes it possible to eliminate wholly all gearing, drive chains and the like from the driving mechanism and that this advantage is gained without in the least affecting the transmission of power to the driving wheels and without restricting the movement of the vehicle body and parts attached thereto with respect to the driving wheels. The number of the parts being so small and the simplicity of the mechanism correspondingly great, a most direct and efficient driving mechanism is thereby provided.

Many departures, of course, may be made from the embodiment of the invention illustrated and described, and, as was said above, the invention may be applied to vehicles which run on tracks as well as to motor road vehicles.

It should be particularly observed that while the term " universal joint " has been used throughout the present description, in many vehicles such as railroad cars where the relative movement between the wheels and car trucks or vehicle body is relatively small and takes place almost wholly in a vertical direction, a simpler form of flexible joint may be used than one which is technically a " universal joint ".

I claim as my invention:—

1. In a power driven vehicle the combination of a driving wheel, a motor, a shaft connected to the armature of the motor and also to the wheel by universal couplings, and a brake mechanism applied only to the armature of the motor.

2. In a power driven vehicle the combination of a motor having an armature, a driving wheel, a yieldable connecting means between the motor and wheel, and a brake mechanism which acts directly and only upon a member rigidly connected to the armature.

3. In a power driven vehicle the combination of a motor having an armature, a driving wheel, a shaft having a universal connection to the armature and also a universal connection to the driving wheel and a brake mechanism which acts directly and only upon a member rigidly connected to the armature.

4. In a power driven vehicle the combination of a motor having an armature, a driving wheel, a yieldable connecting means between the armature and the driving wheel and a brake mechanism adapted to coöperate with a member connected to the armature; said brake mechanism and said member both located within the casing of the motor.

5. In a power driven vehicle, the combination of a driving wheel, a hollow axle upon which the wheel is swiveled, an electric motor supported to have relative movement with the axle, a shaft between the electric motor and driving wheel operatively connecting the motor and wheel, a universal coupling at each end of the shaft, said shaft being extended into said motor in order to lengthen said shaft and reduce its oscillatory movement, and a brake mechanism which is applied only to a brake drum upon the armature of the motor.

6. In a power driven vehicle, the combination of two driving wheels, hollow axles upon which the wheels are swiveled respectively, two electric motors supported between the driving wheels to have relative movement of the axles, a shaft operatively connecting each motor and the corresponding driving wheel, a universal coupling at each end of each shaft, each shaft being extended into said driving element in order to lengthen said shaft and reduce its oscillatory movement, and brake mechanisms which are applied only upon brake drums upon the inner end of the armature shafts of the motors.

This specification signed and witnessed this 6th day of September, A. D., 1907.

ERNST GUSTAV HOFFMANN.

Signed in the presence of—
LUCIUS E. VARNEY,
AMBROSE L. O'SHEA.